(12) United States Patent
Kandel

(10) Patent No.: US 12,566,617 B2
(45) Date of Patent: Mar. 3, 2026

(54) SELECTING ACCESSIBILITY PLUGINS FOR USERS WITH DISABILITIESP

(71) Applicant: JPMorgan Chase Bank, N.A., New York, NY (US)

(72) Inventor: Stacy Newman Kandel, Easton, PA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 172 days.

(21) Appl. No.: 18/415,008

(22) Filed: Jan. 17, 2024

(65) Prior Publication Data

US 2024/0241734 A1    Jul. 18, 2024

Related U.S. Application Data

(60) Provisional application No. 63/439,449, filed on Jan. 17, 2023.

(51) Int. Cl.
*G06F 9/445*    (2018.01)
*G06F 9/451*    (2018.01)

(52) U.S. Cl.
CPC .......... *G06F 9/44526* (2013.01); *G06F 9/451* (2018.02)

(58) Field of Classification Search
CPC ............................ G06F 9/44526; G06F 9/451
See application file for complete search history.

(56) References Cited

U.S. PATENT DOCUMENTS

| | | | | |
|---|---|---|---|---|
| 2004/0268360 | A1* | 12/2004 | Atkin | G06F 16/957 |
| | | | | 707/E17.119 |
| 2010/0205523 | A1* | 8/2010 | Lehota | G06F 16/9577 |
| | | | | 715/765 |
| 2017/0230470 | A1* | 8/2017 | Ravishankar | G09B 21/009 |
| 2019/0121633 | A1* | 4/2019 | Chen | G06F 16/9574 |
| 2021/0055856 | A1* | 2/2021 | Capurso | G06F 3/04845 |
| 2021/0342522 | A1* | 11/2021 | Khorana | H04L 67/561 |
| 2022/0366003 | A1* | 11/2022 | Ekron | G06F 40/109 |

* cited by examiner

*Primary Examiner* — Keith D Bloomquist
(74) *Attorney, Agent, or Firm* — GREENBLUM & BERNSTEIN, P.L.C.

(57) ABSTRACT

A method of selecting accessibility plugins for disabled users is disclosed. In one example, the method includes determining accessibility requirements of a user to access a website. The method then selects, without user intervention, one of many accessibility plugins to satisfy the accessibility requirements of the user to access the website. Here, each one of the accessibility plugins has an accessibility requirement different from that of another accessibility plugin. The method then installs, without user intervention, the selected accessibility plugin to facilitate use of the website by the user.

14 Claims, 6 Drawing Sheets

100

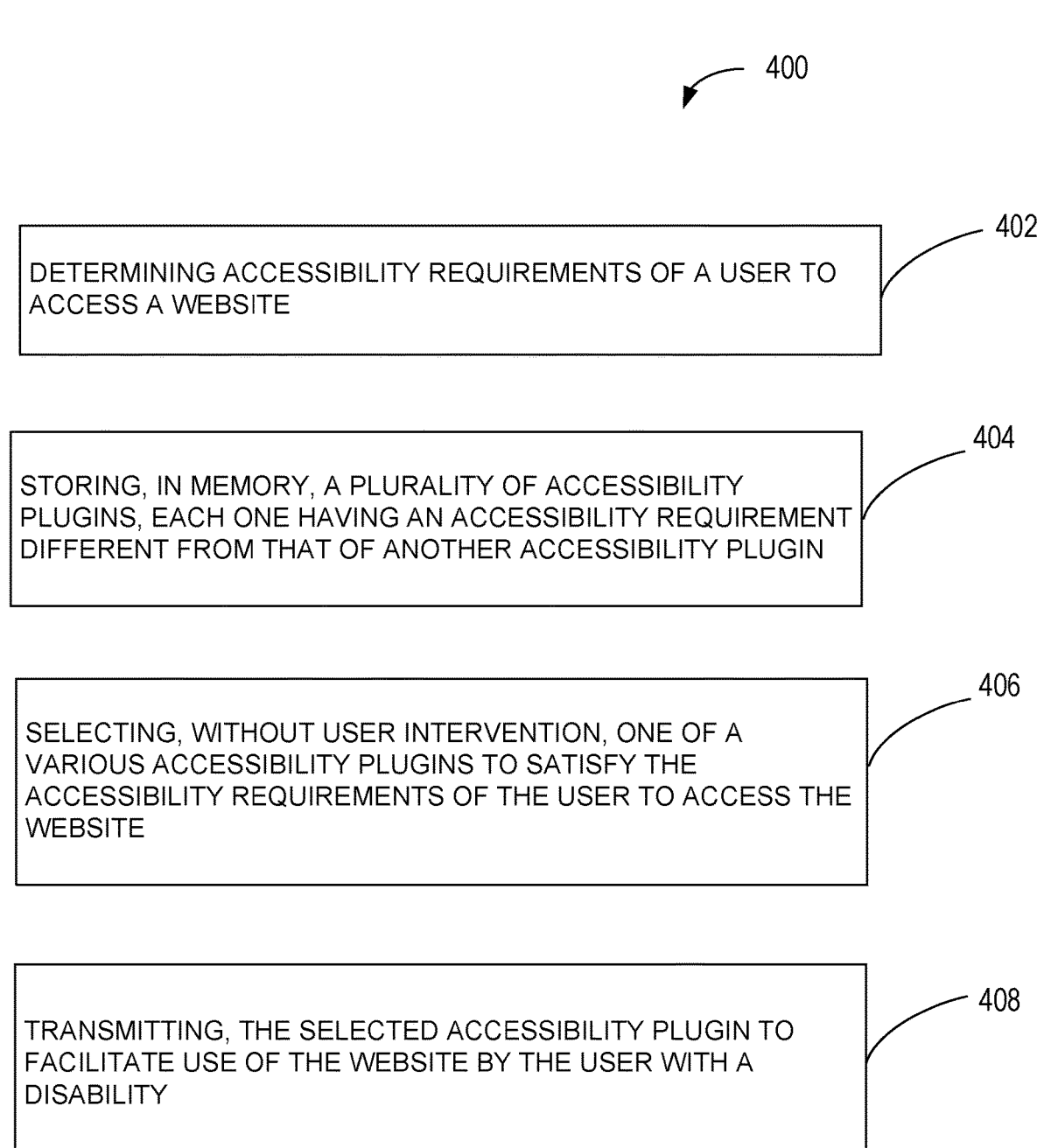

400

DETERMINING ACCESSIBILITY REQUIREMENTS OF A USER TO ACCESS A WEBSITE

402

STORING, IN MEMORY, A PLURALITY OF ACCESSIBILITY PLUGINS, EACH ONE HAVING AN ACCESSIBILITY REQUIREMENT DIFFERENT FROM THAT OF ANOTHER ACCESSIBILITY PLUGIN

404

SELECTING, WITHOUT USER INTERVENTION, ONE OF A VARIOUS ACCESSIBILITY PLUGINS TO SATISFY THE ACCESSIBILITY REQUIREMENTS OF THE USER TO ACCESS THE WEBSITE

406

TRANSMITTING, THE SELECTED ACCESSIBILITY PLUGIN TO FACILITATE USE OF THE WEBSITE BY THE USER WITH A DISABILITY

SELECTING ACCESSIBILITY PLUGINS FOR USERS WITH DISABILITIESP

CROSS-REFERENCE TO RELATED APPLICATIONS

This application is based upon and claims the benefit of priority from U.S. Provisional Application No. 63/439,449, filed on Jan. 17, 2023, the entire contents of which are incorporated herein by reference.

BACKGROUND

The general population can easily interact with computer-based devices to access the Internet or other applications. Examples of computer-based devices are desktop computers, laptop computers, smart phones and the like. The general population can utilize such devices to conveniently access online services like healthcare, banking, etc. A percentage of the population do have cognitive or physical disabilities. Such disabilities can include low vision, color blindness, hearing loss, and Parkinson's disease, for example.

BRIEF DESCRIPTION OF THE DRAWINGS

The drawings illustrate only particular examples of the disclosure and therefore are not to be considered to be limiting of their scope. The principles here are described and explained with additional specificity and detail through the use of the accompanying drawings.

FIG. 4 illustrates a flow diagram for selecting and installing an accessibility plugin for a user with a disability according to examples of the present disclosure.

DETAILED DESCRIPTION

Figure 1:
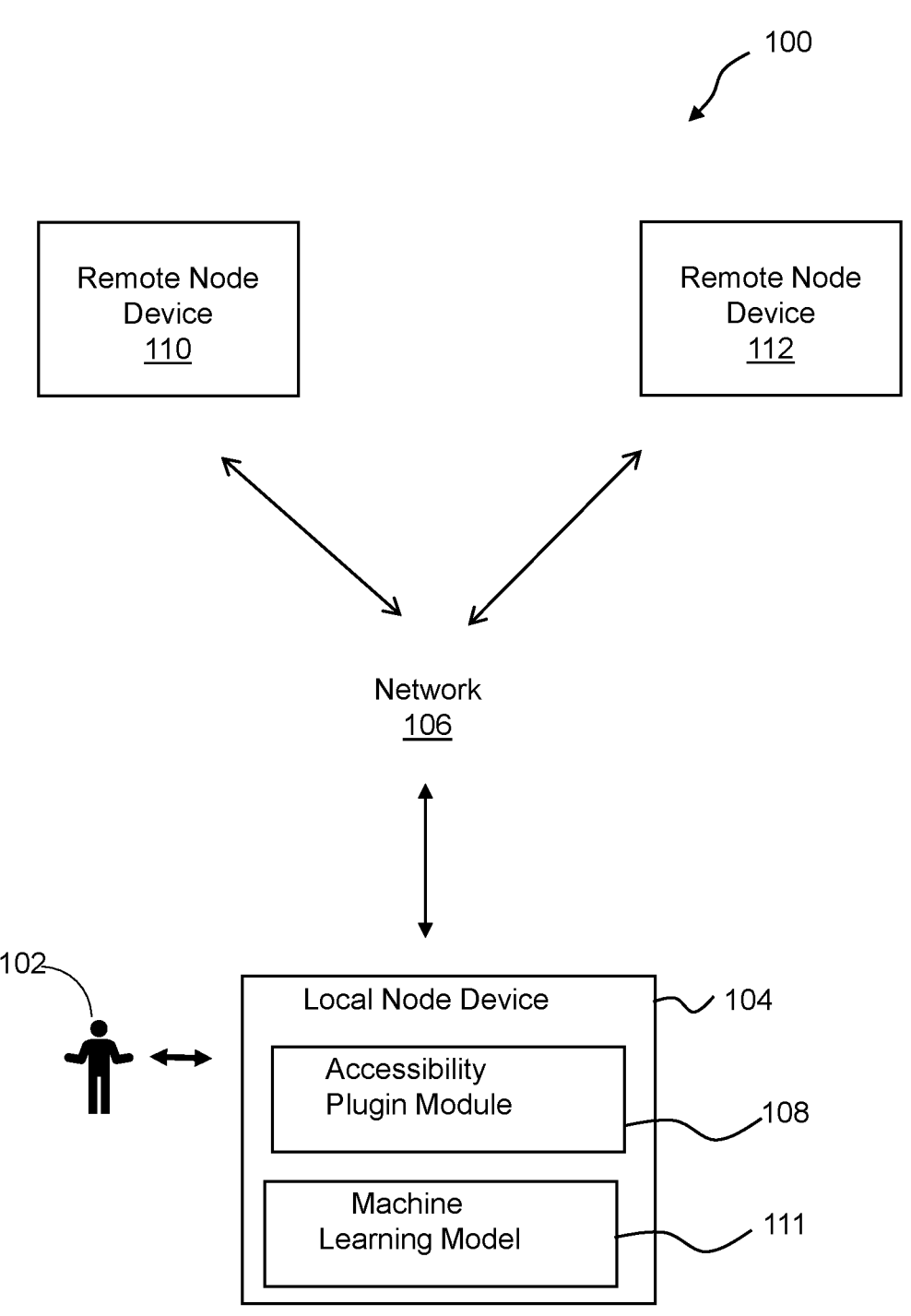
FIG. 1 illustrates a computer platform for selecting accessibility plugins for users with disabilities according to examples of the present disclosure.

Web accessibility continues to remain an issue for people with disabilities. As such, laws, regulations and guidelines such as WCAG (Web Content Accessibility Guidelines) have been enacted to address this problem. Individuals with disabilities such as low vision, color blindness, hearing loss, and Parkinson's disease, for example, continue to experience limited or no web accessibility.

Assistive devices that facilitate web access to individuals with disabilities are available. Examples of such assistive devices include screen readers such as JAWS or NVIDIA. However, such assistive devices may be cost prohibitive and not readily accessible to those that need the devices. A user with a disability who cannot afford to purchase a screen reader for the user's computer cannot interact with any website. Even when an assistive device is affordable or available, the website that is being accessed may not be WCAG-compliant. Non WCAG-compliant websites lack alternative text for images, multimedia captions for videos, etc. Thus, even when a user with a disability such as low vision (or no vision) uses a JAWS or NVIDA screen reader to access a noncompliant website content, the user is nevertheless unable to interact with the website (or application).

The present disclosure addresses the foregoing by providing a system, method and computer program product that provides accessibility plugins to users with disabilities. In one example, the method is implemented without the need for user intervention. This lack of user intervention facilitates use by people with disabilities who may lack cognitive or physical capabilities.

The method includes determining accessibility requirements of the user to access a website. In some examples, determining accessibility requirements may be based on a user profile. In other implementations, determining accessibility requirements may be based on a machine learning model (and a user profile). The method stores, in memory, a plurality of accessibility plugins, each one having an accessibility requirement different from that of another accessibility plugin. The method then selects, without user intervention, one of the various accessibility plugins to satisfy the accessibility requirements of the user with the disability to access the website. The method then transmits, the selected accessibility plugin to facilitate use of the website by the user with a disability.

In other words, different accessibility plugins can be automatically selected and downloaded as the user browses from website to website. Each one of the accessibility plugins may have an accessibility requirement different from that of another accessibility plugin. In this manner, users can use different applications and websites and corresponding accessibility plugins that are specific to them. The method includes, installing, without user intervention, the selected accessibility plugin to facilitate use of the website by the user.

Thus, access to websites and applications is not limited to users with disabilities. A user with a disability such as poor vision does not require a cost-prohibitive device such as a screen reader. The experience of using a web browser to access an app or website that is not WCAG-compliant is also enhanced because plug-in adjustments such as changing color contrast of hex values, enlarging font size, or enabling basic keyboard shortcuts, etc., can be made. With the present disclosure, a user no longer requires a screen reader as users with disabilities can use the accessibility web plug-ins to supplement and enhance their experience.

FIG. 1 illustrates a block diagram of an example distributed processing system 100 to provide an accessibility plugin for a user 102 with a disability according to examples of the present disclosure, the distributed processing system 100 incorporating a remote node device 110 and a local node device 104 to access a remote node device 112. The remote node device 110, the local node device 104 and the remote node device 112 may be computing devices.

Remote node device 110 may be a repository for various types of accessibility plugins for use by individuals with disabilities. The repository may store, in memory, different types of accessibility plugins, some of which accessibility plugins may be set or predetermined for certain user types. Although remote and external to a local node device 104, in one implementation, the repository itself may be incorporated with the local node device 104.

The remote node device 112 may be a webserver causing display of webpages or websites for access by user 102 with disability. The webserver may be an HTTP webserver, for example.

The local node device 104 may include an accessibility plugin module 108 to facilitate the retrieval of accessibility plugins from the remote node device 110, such that individuals with disabilities can access and interact with webpages/websites served up by the remote node device 112. Local node device 104 may include a machine learning model 111 to facilitate selection of plugins that match the user's accessibility profile requirement.

Although not shown, distributed processing system 100 may include any computer communication system that allows point-to-point communication between two or more end points of all data types including audio, video, etc., and any associated metadata. The communication system may comprise a combination of one or more of the Internet and cloud services for the execution of microservice applications.

Figure 2:
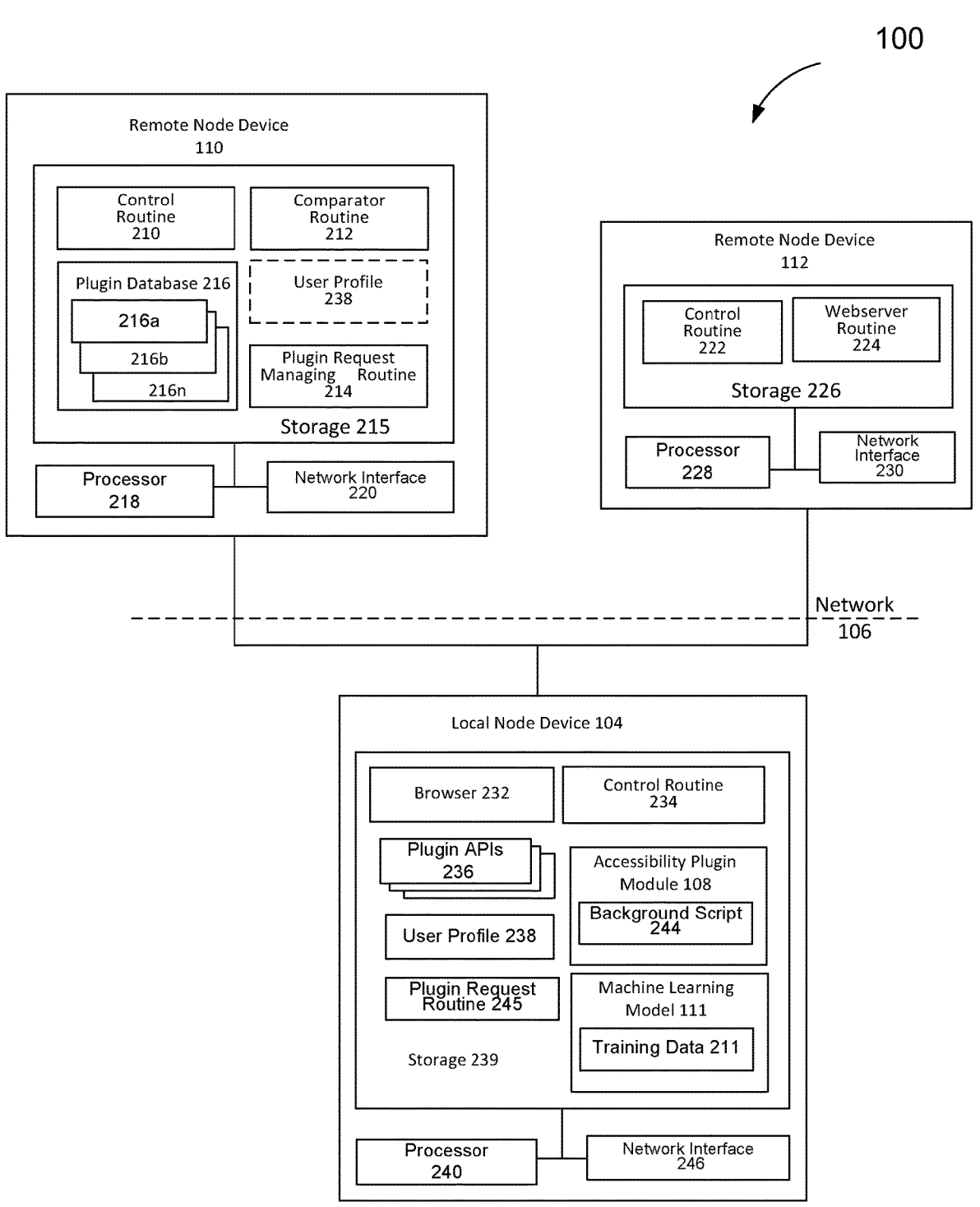
FIG. 2 illustrates components of the computer platform of FIG. 1 according to examples of the present disclosure.

Referring now to FIG. 2, which illustrates components of the distributed processing system 100, the remote node device 110 may incorporate one or more of, a processor 218, a storage 215, and a network interface 220. The storage 215 may store a control routine 210, a comparator routine 212, a plugin database 216 storing a plurality of accessibility plugins 216a, 216b . . . 216n, a user profile 238 and a plugin request managing routine 214. The control routine 210 may incorporate a sequence of instructions operative on the processor 218 to implement logic to perform various functions, at least partially in parallel with the processor 218 and other processors of the distributed system. In executing the control routine 210, the processor 218 may operate the network interface 220 thereof to receive items of data and to transmit same to local node device 104.

The control routine 210 in conjunction with the plugin request managing routine 214 may cause the receipt of a plugin download request and an associated user profile 238 from local node 104. Further, the control routine 210 in conjunction with a comparator routine 212 may cause analysis and comparison of the user profile 238 attributes with plugins 216a, 216b . . . 216n to determine a matched plugin for downloading to local node device 104 responsive to the plugin download request.

Turning now to local node device 104, this device may incorporate one or more of, a processor 240, a storage 239, and a network interface 246. The storage 239 may store a browser 232 (or another application, not shown), plugin APIs 236 for browser 232, the user profile 238, a control routine 234, an accessibility plugin module 108 having a background script 244, a plugin request routine 245 and the machine learning model 111 including training data 211. The control routine 234 may incorporate a sequence of instructions operative on the processor 240 to implement logic to perform various functions, at least partially in parallel with the processor 240 and other processors of the distributed system. In executing the control routine 234, the processor 240 may operate the network interface 246 thereof to receive items of data and to transmit same to remote node device 112 and remote node device 110.

In one example implementation, execution of the control routine 234 in conjunction with the plugin request routine 245 is operative to cause processor 240 to transmit a request to download an accessibility plugin from remote node device 110. Along with the accessibility plugin download request, the user profile 238 is also transmitted to the remote node device 110. In another example implementation, execution of the control routine 234 in conjunction with the background script 244 may be operative to cause the processor to run a background script that can listen for events. Examples of such events may include page loads, clicks, loading of browser 232, loading of a webpage, etc.

Upon receipt of a predetermined event, the plugin request routine 245 is initiated and operative to cause processor 240 to transmit, to remote node device 110, a request to download the accessibility plugin, the request to download including the user profile 238 for which the accessibility plugin is to be matched. The accessibility plugin may interface with browser 232 (for example) via the plugin API 236. The machine learning model 111 is operative to suggest the appropriate accessibility plugin for downloaded based on training data 211 that is fed to the machine learning model 111 over time.

Referring now to remote node device 112, the remote node device 112 may include one or more of, a processor 228, a storage 226, and a network interface 230. The storage 226 may store a control routine 222 and a webserver routine 224. The control routine 222 may incorporate a sequence of instructions operative on the processor 224 to implement logic to perform various functions, at least partially in parallel with the processor 228 and other processors of the distributed system. In executing the control routine 222, the processor 228 may operate the network interface 230 thereof to receive items of data and to transmit same to local node device 104. Here, execution of the control routine 222 in conjunction with the webserver routine 224 is operative to cause processor 240 to transmit a webpage(s) responsive to an HTTP request from local node device 104.

In operation, user 102 with a disability may desire to access a website (not shown) hosted by remote node device 112. User 102 begins by initiating the browser 232 of local node device 104. In one example implementation, responsive to initiation of the browser 232, the background script 244 which is running in the background detects the browser initiation as an event. In another example implementation, background script 244 may detect the loading of a particular website as an event. In either case, background script 244 under the auspices of control routine 234 initiates the plugin request routine 245. The plugin request routine 245 causes transmission of a request to download an accessibility plugin (along with user profile 238) to remote node device 110.

The accessibility plugin permits seamless interaction between user 102 and any website. User 102 need not utilize expensive and cost-prohibitive screen readers, and the accessibility plugin selection process occurs seamlessly without user interaction. The accessibility computer platform of the present disclosure makes websites accessible for disabled users who otherwise would be unable to utilize such websites (or applications). The accessibility computer platform does not limit the access of people with certain disabilities. In one example, the user profile 238 is based on user 102's own accessibility requirements. An example of the user profile 238 is the user profile 300 of FIG. 3.

The plugin request managing routine 214 of remote node device 110 receives and manages the accessibility plugin download request from local node device 104. The plugin request managing routine 214 stores the user profile 238 after which the comparator routine 212 is initiated. The comparator routine 212 is operative to analyze attributes of user profile 238 to determine which one of accessibility plugins 216a, 216b . . . 216n best matches the user profile 238.

In one example, accessibility plugin 216a may be a contrast accessibility plugin. If user 102 has a low vision impairment, accessibility plugin 216a is the appropriate plugin to work with browser 232 to provide high or increased color contrast. In another example, if user 102 has complete blindness impairment, accessibility plugin 216b which is a screen reading accessibility plugin may be selected to provide screen reading capabilities.

Note that the same single profile can then be used to support selection and download of multiple accessibility plugins that can vary from website to website or application to application. Where the system determines that a particular website can work better with a different plugin, a new or additional plugin is automatically downloaded for use with that website. Examples of additional accessibility plugins that work with browser 232 may provide other accessibility features including increased font size, high color contrast, speech-to-text, text-to-speech, etc.

Remote node device 110 then transmits via network interface 220 and network 106, the selected plugin to local node device 104 for use. In the case of browser 232, the selected plugin interfaces with the browser via plugin APIs 236 to provide the accessibility functionalities. Each profile and its corresponding match are fed as training data 211 to the machine learning model 111. Machine learning model 111 can then suggest future accessibility plugins for download based on user profiles.

Figure 3:
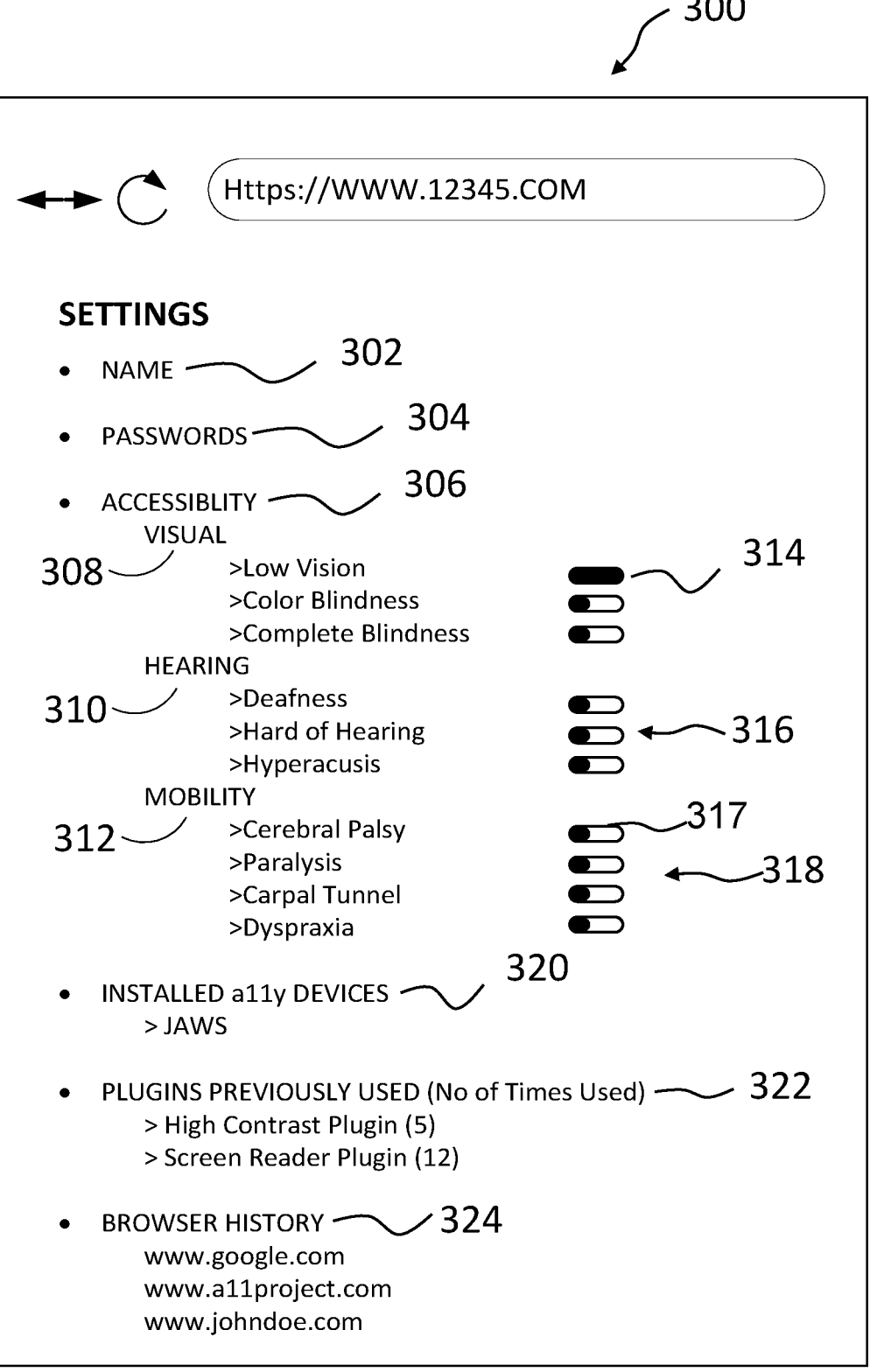
FIG. 3 illustrates a user profile according to examples of the present disclosure.

FIG. 3 shows a user profile 300 for user 102 according to examples of the present disclosure.

In FIG. 3, user profile 300 includes a variety of selectable settings the user 102 can use to define accessibility requirements to select accessibility plugins 216a, 216b or 216n (FIG. 1). In this example, the user profile 300 includes settings for name 302, passwords 304 and accessibility options 306.

Accessibility options 306 enables people with different disabilities to set their accessibility requirements. Specifically, users with visual impairment can set options under visual 308, users with hearing impairment can set requirements under hearing 310 and users with mobility impairment can set requirements under mobility 312. Under visual 308, users can select low vision, color blindness and/or complete blindness. In fact, as can be seen here, the option button 314 is turned on, indicating that user 102 has a low vision impairment (for example).

Under hearing 310, users can select the appropriate option button 316 for deafness, hard of hearing and hyperacusis. None of the option buttons 316 is turned on, indicating that user 102 has no hearing impairment. Under mobility 312, users can select the corresponding option button 318 for cerebral palsy, paralysis, carpal tunnel and dyspraxia. If for example, the user has cerebral palsy, option button 317 would be selected. Selecting and turning on option button 317 may be associated with a "switch" accessibility plugin.

In FIG. 3, a list of installed a11y devices 320 include the screen reader JAWS. In one implementation, when a screen reader such as JAWS or NVDA is installed, the system detects the installed screen readers, and does not install a screen reading accessibility plugin as this would be redundant. For example, where user 102 has low vision impairment and has set a low vision requirement, the system ignores the requirement if a screen reader is detected.

As shown, a list of plugins previously used 322 includes the number of times the plugin has been used. In this example the high contrast plugin has been used 5 times, while the screen reader plugin has been used 12 times. The browser history 324 shows that www.google.com, www.a11yproject.com and www.johndoe have all been accessed.

Thus, the accessibility computer platform of the present disclosure can utilize user profiles (e.g., user profile 300) to provide one or more designated capabilities including, but not limited to, screen reading capabilities, high color contrast, voice enablement, increased font and text sizes, etc. The user profile 300 may also store any accessibility (a11y) accommodations and preferences that the user 102 has defined on set up, such as high color contrast or a preference for keyboard short cuts.

The accessibility computer platform may track the historical usage of accessibility plugins. For example, if over time, accessibility plugin 216a is used more than the other accessibility plugins, the accessibility computer platform gives selective preference to accessibility plugin 216a. As such, if two accessibility plugins are equally selectable based on having other similar factors, the most used accessibility plugin is selected for installation.

The accessibility computer platform may also track usage feedback from user 102. That is, user profile 300 may store any feedback that user 102 has provided to help provide for continuous improvement of the holistic experience. If over time, accessibility plugin 216a receives more positive feedback than other accessibility plugins, for example, the system gives selective download preference to accessibility plugin 216a. That is, if two accessibility plugins are equally selectable for download based on having other similar factors, the accessibility plugin with the highest user rating is selected for download and installation.

The accessibility computer platform may also track versions of available accessibility plugins. If a newer version of an accessibility plugin is available, the older version of the accessibility plugin is uninstalled and replaced with a newer version of the accessibility plugin.

FIG. 4 is a method 400 for selecting an accessibility plugin 216a, 216b or 216n according to examples of the present disclosure.

At block 402, method 400 determines accessibility requirements of user 102 to access a website (not shown) hosted by remote node device 112 of FIG. 1. As used herein, an accessibility requirement is an attribute, parameter or setting for a user with disability that facilitates access to a website or application or facilitates the navigation and use of the application or website. As an example, low vision may be an accessibility requirement. Here as previously discussed, user 102 may have a disability that makes using a web browser to access a website challenging or unattainable. Disabilities include poor vision, color blindness, and the like.

In one implementation, determining accessibility requirements of user 102 may involve accessing the user profile 300 (FIG. 3), for example. Here, the system parses the user profile 300 to extract the pertinent accessibility requirements to determine the appropriate accessibility plugin 216a, 216b, 216n. In another implementation, the system may rely on machine learning model 111 to determine the accessibility requirements as discussed with reference to FIG. 5.

At block 404, method 400 involves storing, in memory, a plurality of accessibility plugins, each one having an accessibility requirement different from that of another accessibility plugin. Here, each one of the accessibility plugins 216a, 216b, 216n has an accessibility requirement different from that of another accessibility plugin.

For example, accessibility plugin 216a may be a high contrast plugin, and its accessibility requirement may relate to low vision. As another example, accessibility plugin 216b may be a screen reader plugin and its accessibility requirement may relate to complete blindness impairment.

At block 406, method 400 involves selecting, without user 102's intervention, one of the available accessibility plugins 216*a*, 216*b*, 216*n* to satisfy the accessibility requirements of the user 102 to access the website.

At block 408, without user intervention, the selected accessibility plugin is downloaded and installed to facilitate use of the website by the user. Although not shown, method 400 may involve accessing user activities and historical usage of same or similar plugins to select the accessibility plugin 216*a*, 216*b* or 216*n* that meets the user 102's accessibility requirements.

Figure 5:
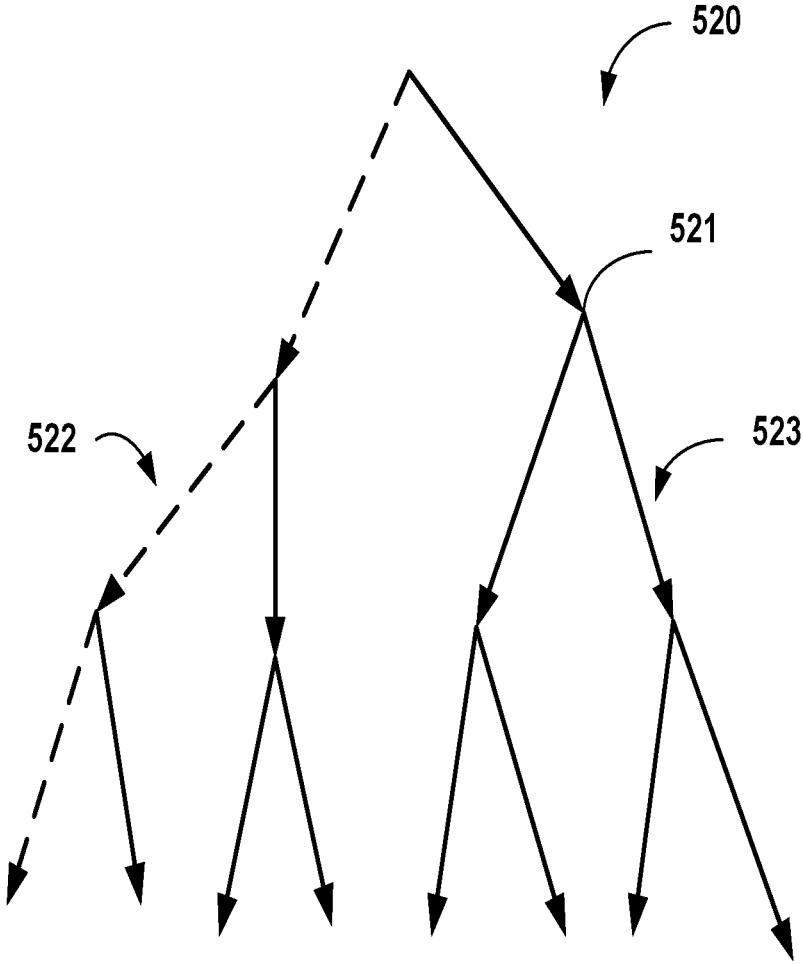
FIG. 5 illustrates a machine learning model decision tree according to examples of the present disclosure.

FIG. 5 illustrates a decision tree 520 to implement the machine learning model 111 (FIG. 2) according to an example of the present disclosure.

In an implementation, machine learning model 111 may be based on a classification method. The classification method may correspond to one or more of support vector machines (SVM), random forest (RF) and artificial neural networks (ANN), for example. In one example, an RF classification method can be used. The RF classification method is a collection of decision trees such as decision tree 520 that can predict or select a plugin based on user profile input data. That is, each individual decision tree includes branches that classify user profile input data according to their characteristics (e.g., type of impairment, username, history of use of plugins, websites accessed, etc.). In an example, a large number of user profile input data can be processed by the decision tree. Each user profile input data that is processed follows its specific path through the decision tree. Each user profile input data having the same or similar characteristics will follow the same path within the classification tree.

Running such data through the decision tree thus leads to a learning phase to identify the specific branches of the tree that can be linked to make plugin selections. Such learning phase may take place based on building numerous decision trees with many branches each, including paths that discriminate among different user profile input data.

RL (Reinforcement Learning) with OpenAI Gym may also be utilized. The three categories of learning are: supervised, unsupervised and RL. In supervised learning, a target value or class is predicted where the input data for training is already having labels assigned to it. Unsupervised learning uses unlabeled data for looking at patterns to make clusters, or doing PCA/anomaly detection. RL algorithms are optimization procedures to find best methods to earn maximum reward i.e. give winning strategy to attain objective. Within RL, interaction-based learning is also known as model-free learning where the agent doesn't have exact knowledge of the environment i.e. agent doesn't store the knowledge of state-action probability transition function. It tries to approximate the best choice or the winning strategy.

Referring now to FIG. 5, path 523 is identified during the learning phase as corresponding to an expected plugin selection, path 522 is identified during learning as corresponding to another expected plugin selection. For example, path 523 may involve a plugin selection based on a visual impairment of the user. Plugin selections that address visual impairments will proceed along path 523, impairments that address another disability such a hearing loss proceed along path 522.

At each intersection such as 521, a test such as for example "is the selection accurate" is made. This is of course a symbolic representation and processing of expected selections can be significantly more complex. In an example, processing builds a tree, whereby each branch of the tree represents expected recommendations, whereby each branch is associated with an expected recommendation. Classification may increase in precision as additional user profile input data is processed. This progressive process is referred to as the learning phase, whereby classification becomes increasingly more accurate at future selections.

Figure 6A:
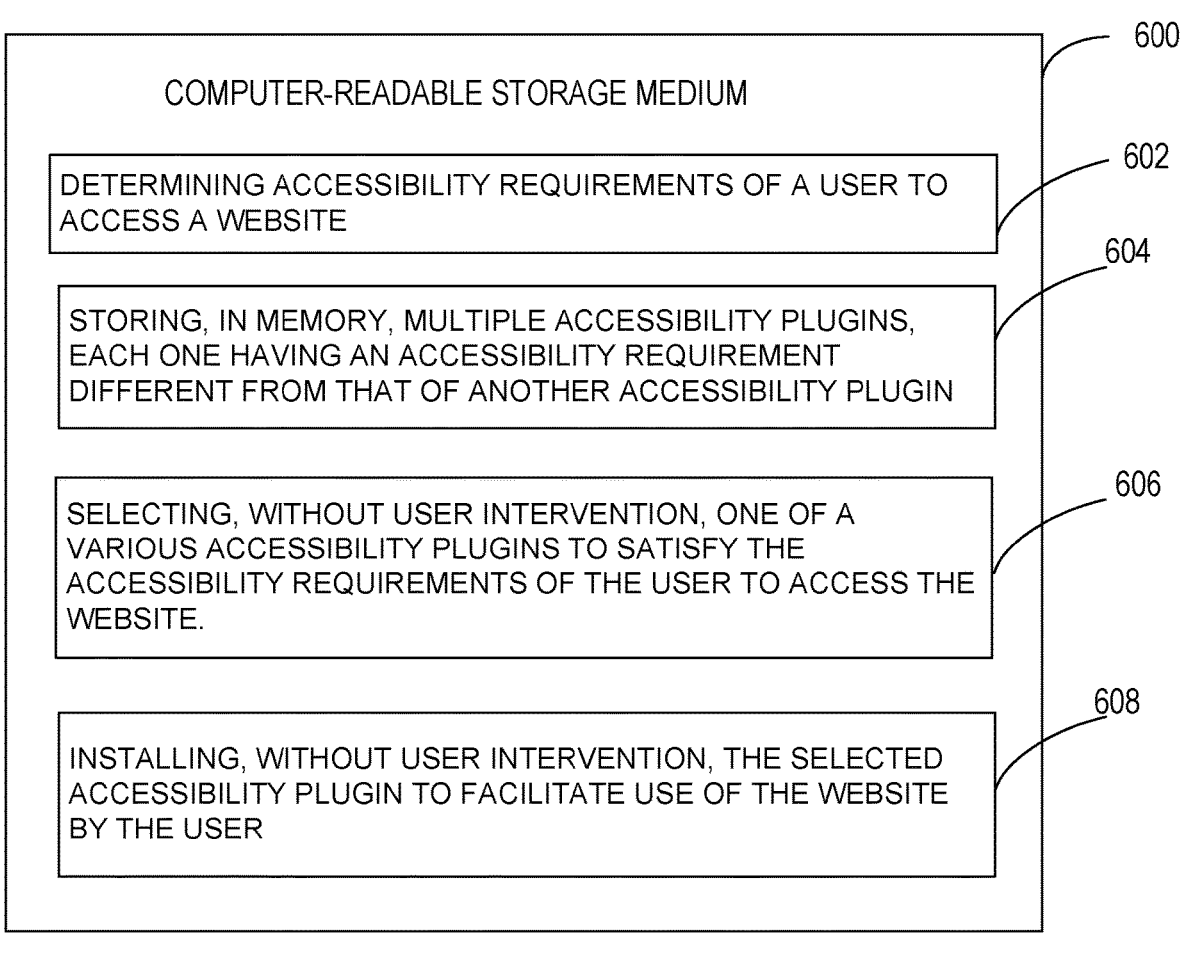
FIG. 6A illustrates a computer readable storage medium for selecting and installing an accessibility plugin according to examples of the present disclosure.
Figure 6B:
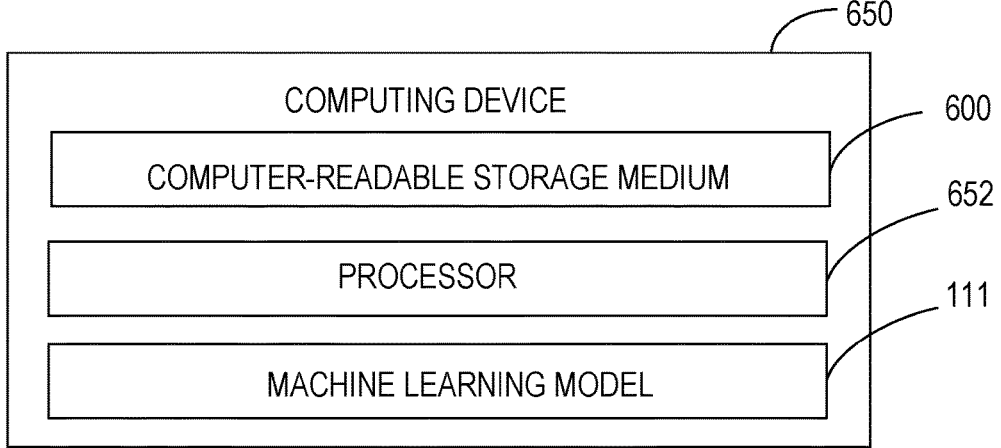
FIG. 6B illustrates a computing device for selecting and installing an accessibility plugin according to examples of the present disclosure.

FIG. 6A illustrates example instructions stored on a non-transitory computer-readable storage medium 600 for using of a user profile to automatically select and install a plugin for a user with a disability according to one example of the present disclosure, and FIG. 6B illustrates an example computing device 650 according to the present disclosure.

As shown in FIG. 6A, the non-transitory computer-readable storage medium 600 includes instruction 602, instruction 604, instruction 605 and instruction 608.

Instruction 602 may cause a processor 652 to determine accessibility requirements of a user to access a website.

Instruction 604 may cause the processor 652 to store, in memory, a plurality of accessibility plugins, each one having an accessibility requirement different from that of another accessibility plugin.

Instruction 606 may cause the processor 652 to select, without user intervention, one of various accessibility plugins to satisfy the accessibility requirements of the user to access the website.

Instruction 608 may cause the processor 652 to install, without user intervention, the selected accessibility plugin to facilitate use of the website by the user. Instruction 608 may cause a processor to use machine learning model to determine the accessibility requirements based on a profile of the user.

The system uses non-transitory computer-readable storage medium which may be any electronic, magnetic, optical, or other physical storage device that stores executable instructions. For example, the non-transitory computer-readable storage medium may be random access memory (RAM), an electrically-erasable programmable read-only memory (EEPROM), a storage drive, an optical disc, or the like. The non-transitory computer-readable storage medium can be encoded to store executable instructions that are stored in memory and wherein the memory is coupled to processor and cause the processor to perform operations according to examples of the disclosure.

The present disclosure may employ a software stack to enlist the underlying tools, frameworks, and libraries used to build and run example applications of the present disclosure. Such a software stack may include PHP, React, Cassandra, Hadoop, Swift, etc. The software stack may include both frontend and backend technologies including programming languages, web frameworks servers, and operating systems. The frontend may include JavaScript, HTML, CSS, and UI frameworks and libraries. In one example, a MEAN (MongoDB, Express.js, Angular JS, and Node.js) stack may be employed. In another example, a LAMP (Linux, Apache, MySQL, and PHP) stack may be utilized.

Any suitable programming language can be used to implement the routines of particular examples including Java, Python, JavaScript, C, C++, assembly language, etc. Different programming techniques can be employed such as procedural or object oriented. The routines may execute on specialized processors.

The specialized processor may include memory to store a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a software program.

As used in the description herein and throughout the claims that follow, "a", "an", and "the" include plural references unless the context clearly dictates otherwise. Also, as used in the description herein and throughout the claims that follow, the meaning of "in" includes "in" and "on" unless the context clearly dictates otherwise. While the above is a complete description of specific examples of the disclosure, additional examples are also possible. Thus, the above description should not be taken as limiting the scope of the disclosure which is defined by the appended claims along with their full scope of equivalents.

The invention claimed is:

1. A distributed processing system comprising:
a local node device having a network interface, a first processor, and a non-transitory computer readable storage media having instruction thereon for execution by the first processor is operable to cause the first processor to perform operations comprising:
generating an accessibility plugin download request for a user with a disability to access a website;
generating a user profile for a user with the disability; and
transmitting, via the network interface and a network, the accessibility plugin download request and the user profile;
a remote node device having a second processor and a non-transitory computer-readable storage media having instruction thereon for execution by the second processor which when executed is operable to cause the second processor to perform operations comprising:
storing, in memory, a plurality of accessibility plugins;
receiving, via the network, the accessibility plugin download request and the user profile from the local node device;
determining, based on the user profile and without user intervention, at least one compatible plugin from among the plurality of accessibility plugins that satisfy the accessibility requirements of the user with the disability to access the website;
selecting a first accessibility plugin from among the at least one compatible plugin, wherein the selecting of the first accessibility plugin is based on at least one from among a number of uses for each respective corresponding compatible plugin of the at least one compatible plugin and user feedback for each respective corresponding compatible plugin of the at least one compatible plugin; and
transmitting, to the local node device for installation, the selected first accessibility plugin to facilitate access to the website by the user with the disability.

2. The distributed processing system of claim 1, wherein the operations caused by the second processor further comprise using a machine learning model to determine the accessibility requirements based on the user profile.

3. The distributed processing system of claim 2, wherein the machine learning model includes analyzing the user profile via a decision tree having a plurality of branches, wherein the user profile is input into the decision tree to identify at least one branch from among the plurality of branches that is linked to a possible accessibility plugin selection, wherein each branch corresponds to a different respective accessibility requirement from among the accessibility requirements.

4. The distributed processing system of claim 1, wherein the operations caused by the second processor further comprise determining the accessibility requirements by accessing a list of historical usage of accessibility plugins.

5. The distributed processing system of claim 1, wherein the operations caused by the second processor further comprise replacing an existing accessibility plugin with a new version of the existing accessibility plugin.

6. The distributed processing system of claim 1, wherein the operations caused by the second processor further comprise determining the accessibility requirements for access to a second website, and installing, without user intervention, a second accessibility plugin to facilitate use of the second website by the user.

7. A computer program product having a non-transitory, computer readable storage medium having instructions stored thereon, which when executed by a processor is adapted to perform the following operations:
determining, based on a user profile of a user with a disability, accessibility requirements of the user to access a website;
storing, in memory, a plurality of accessibility plugins;
determining, based on the user profile and without user intervention, at least one compatible plugin from among the plurality of accessibility plugins that satisfy the accessibility requirements of the user with the disability to access the website;
selecting, without user intervention, a first accessibility plugin from among the at least one compatible plugin, wherein the selecting of the first accessibility plugin is based on at least one from among a number of uses for each respective corresponding compatible plugin of the at least one compatible plugin and user feedback for each respective corresponding compatible plugin of the at least one compatible plugin; and
transmitting, the selected first accessibility plugin to facilitate use of the website by the user with the disability.

8. The computer program product of claim 7, wherein the operations further comprise using a machine learning model to determine the accessibility requirements based on the user profile.

9. The computer program product of claim 7, wherein the determining of the accessibility requirements further includes accessing a list of historical usage of plugins.

10. The computer program product of claim 7, wherein the operations further comprise replacing an existing accessibility plugin with a new version of the existing accessibility plugin.

11. The computer program product of claim 7, wherein the operations further comprise determining the accessibility requirements for access to a second website, and installing, without user intervention, a second accessibility plugin to facilitate use of the second website by the user.

12. A method for selecting an accessibility plugin for a user with a disability, the method comprising:
determining, based on a user profile of a user with a disability, accessibility requirements of the user to access a website;
storing, in memory, a plurality of accessibility plugins;
determining, based on the user profile and without user intervention, at least one compatible plugin from among the plurality of accessibility plugins that satisfy the accessibility requirements of the user with the disability to access the website;
selecting, without user intervention, a first accessibility plugin from among the at least one compatible plugin, wherein the selecting of the first accessibility plugin is based on at least one from among a number of uses for each respective corresponding compatible plugin of the at least one compatible plugin and user feedback for each respective corresponding compatible plugin of the at least one compatible plugin; and transmitting, the selected first accessibility plugin to facilitate use of the website by the user with the disability.

13. The method of claim 12, further comprising using a machine learning model to determine the accessibility requirements based on the user profile.

14. The method of claim 12 further comprising determining the accessibility requirements for access to a second website or application, and installing, without user intervention, a second accessibility plugin to facilitate use of the second website or application by the user.

* * * * *